(12) United States Patent
Brinkman

(10) Patent No.: US 7,063,424 B1
(45) Date of Patent: Jun. 20, 2006

(54) VIDEO SCREEN STORAGE AND DEPLOYMENT SYSTEM

(76) Inventor: Robert E. Brinkman, 454 Knollwood Dr., Barrington, IL (US) 60010

( * ) Notice: Subject to any disclaimer, the term of this patent is extended or adjusted under 35 U.S.C. 154(b) by 0 days.

(21) Appl. No.: 10/922,252

(22) Filed: Aug. 19, 2004

(51) Int. Cl.
*G03B 21/58* (2006.01)

(52) U.S. Cl. .................. 353/74; 359/443; 248/919; 248/917

(58) Field of Classification Search ............... 353/74, 353/79, 72; 359/443, 461; 248/917–924; 348/836
See application file for complete search history.

(56) References Cited

U.S. PATENT DOCUMENTS

| | | | | |
|---|---|---|---|---|
| 4,842,402 A * | 6/1989 | Wise | ............... | 353/74 |
| 5,235,362 A * | 8/1993 | Kronbauer | ............... | 353/71 |
| 5,431,048 A * | 7/1995 | Furuie | ............... | 73/431 |
| 5,491,584 A * | 2/1996 | Schlienger | ............... | 359/443 |
| 5,622,419 A * | 4/1997 | Holder et al. | ............... | 353/119 |
| 6,334,687 B1 * | 1/2002 | Chino et al. | ............... | 353/79 |
| 6,886,701 B1 * | 5/2005 | Hong et al. | ............... | 211/99 |
| 2003/0081184 A1* | 5/2003 | Li et al. | ............... | 353/79 |
| 2004/0036845 A1* | 2/2004 | Hoffmeister et al. | ............... | 353/79 |

* cited by examiner

*Primary Examiner*—William C. Dowling
(74) *Attorney, Agent, or Firm*—Barnes & ThornburgLLP

(57) ABSTRACT

A video screen storage and deployment system, typically for large, flat screens. The system comprises a stationary portion and an active portion, with the active portion having a stowage position and a display position. In the stowage position, the video screen is oriented in a first screen position. In the display position, the video screen is oriented in a second display position, with the first and second screen positions being rotated about 90° from one another.

20 Claims, 4 Drawing Sheets

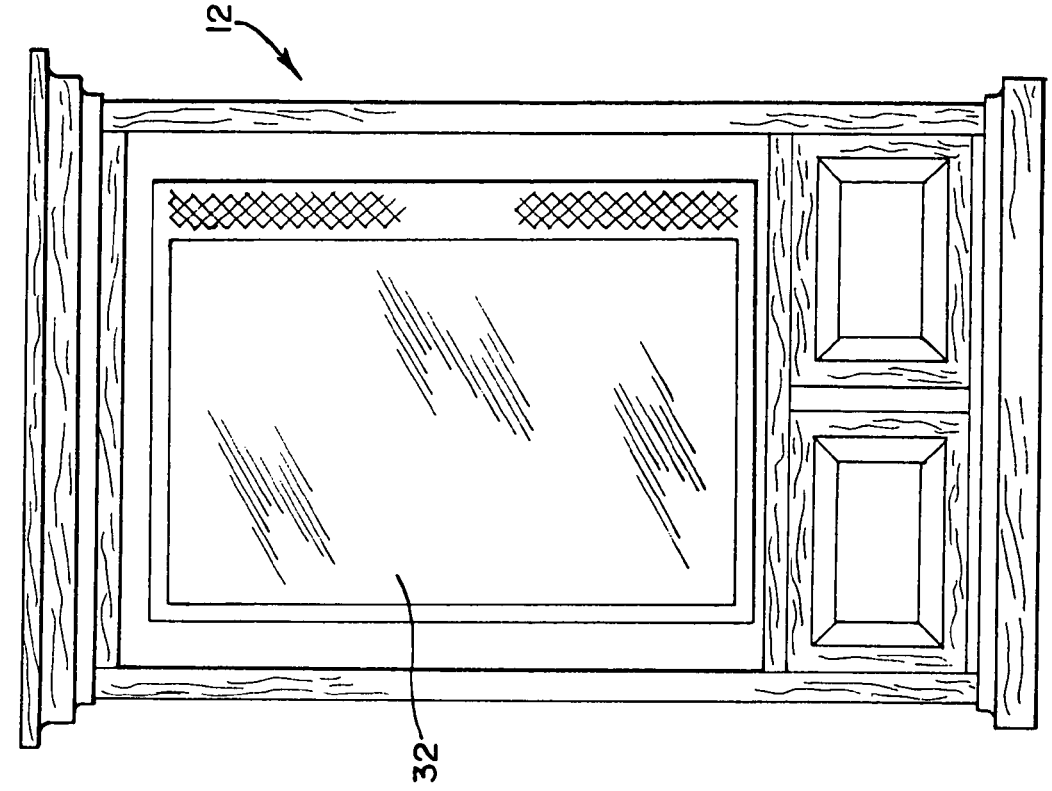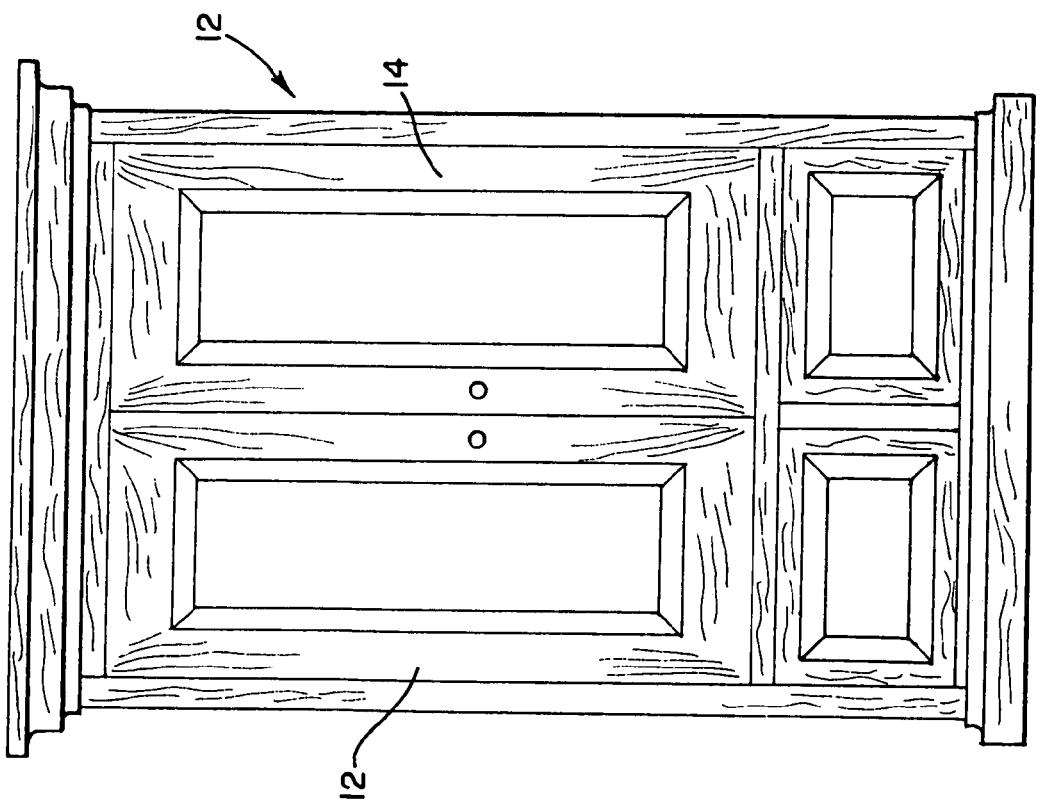

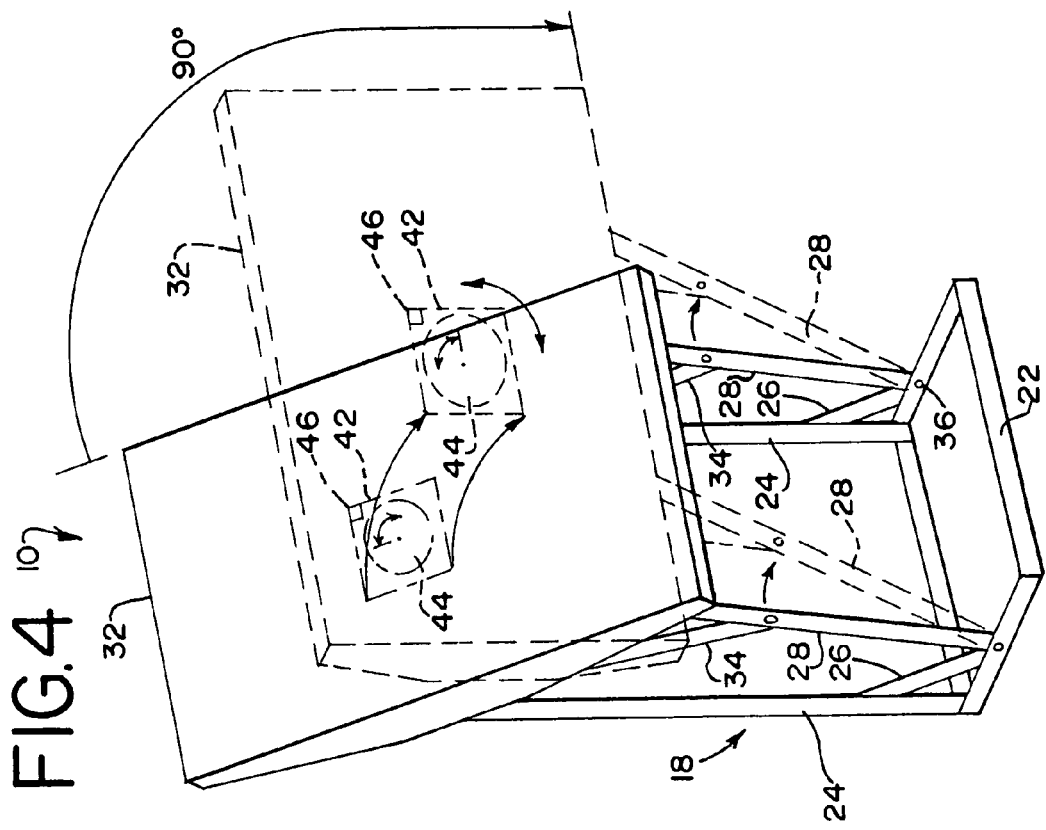
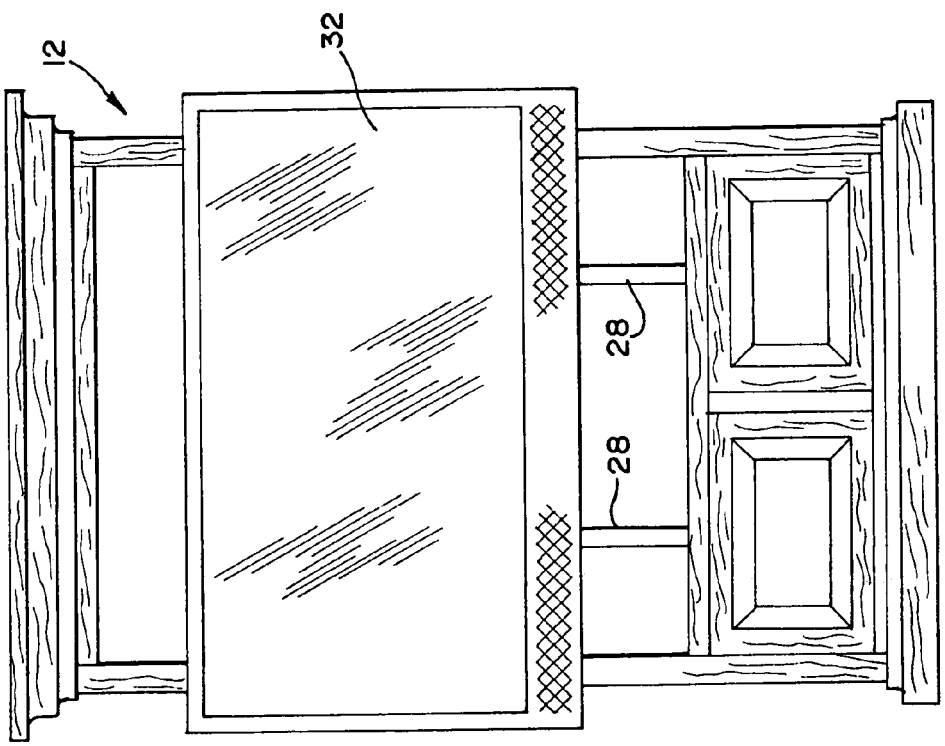

VIDEO SCREEN STORAGE AND DEPLOYMENT SYSTEM

BACKGROUND OF THE INVENTION

This invention relates to video screen systems, and in particular to a video screen storage and deployment system.

Video screens are oriented in a generally horizontal orientation, with the width of the screen greater than the height. For relatively small screens, that poses no particular problems, but for larger screens in a 16:9 format (width to height) the screen can occupy a significant amount of space. In more sophisticated systems, the video screen is contained within a cabinet or some other means of containing the screen when not in use. For large screens, the structure for containing the screen is quite large, and therefore must occupy substantial space.

SUMMARY OF THE INVENTION

The invention is directed to a video screen storage and deployment system. The system comprises a stationary portion and an active portion. The active portion has a stowage position and a display position, with the video screen in the stowage position, having a first screen position and with the video screen, in the second display position, having a second screen position. The first and second screen positions are oriented about 90° from one another. Means is provided in the active portion for appropriately rotating the video screen between the first and second positions.

In accordance with the preferred form of the invention, the stationary portion comprises a fixed frame and the active portion comprises a movable frame which is secured to the fixed frame. Preferably, the fixed frame comprises a base and at least one upright. Similarly, the moveable frame comprises at least one upright and a screen mount extending from the upright, with the upright being hingedly secured to the fixed frame.

A stay is provided for maintaining the movable frame in the display position. In accordance with one form of the invention, the stay comprises a flexible connector extending between the fixed frame and the moveable frame, the flexible connector being an chain, wire, rope or similar flexible device. In another form of the invention, the stay comprises the combination of a fluid cylinder and a flexible connector.

In one form of the invention, a motor is provided for moving the movable frame between the display and stationary position. Preferably, the motor is a servo motor is employed, it is also preferred, though not mandatory, that a stay be provided for maintaining the movable frame in the display position.

The means in the active portion for maintaining the video screen between the first and second screen positions preferably comprises a motor. Most preferably a servo motor is employed, although any type of motor permitting the 90° rotation described will be adequate.

The system of the invention is typically located in a cabinet. When so-located, at least part of the active portion extends outside of the cabinet when in the display position. That is so the video screen can be deployed in its typical, horizontal orientation without interference by the surrounding structure of the cabinet.

BRIEF DESCRIPTION OF THE DRAWINGS

The invention is described in greater detail in the following description of examples embodying the best mode of the invention, taken in conjunction with the drawing figures in which:

FIG. 1 is a front elevational view of a typical cabinet housing the video screen storage and deployment system according to the invention, FIG. 2 is a front elevational view of the cabinet of FIG. 1, with the doors opened and retracted to show the video screen in the stored position, FIG. 3 is a front elevational view similar to FIG. 2, but with the video screen deployed and in the active position, FIG. 4 is a perspective view showing the video screen storage and deployment system according to the invention with a video screen in the stowage position and, in phantom, showing the active portion deployed in the display position.

DESCRIPTION OF EXAMPLES EMBODYING THE BEST MODE OF THE INVENTION

Figure 5:
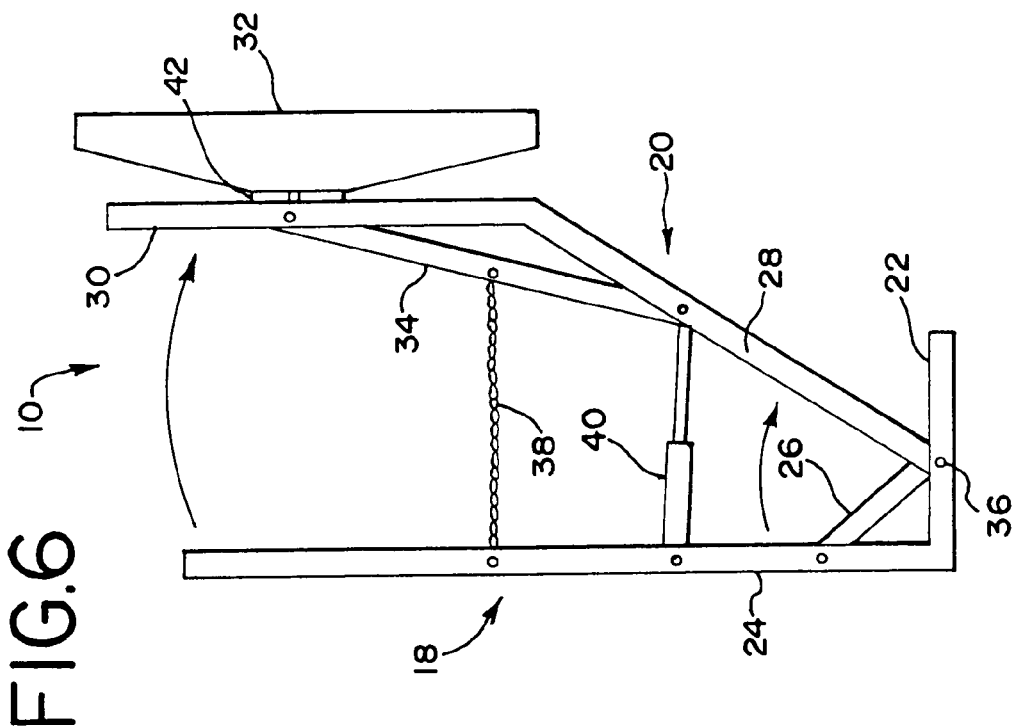
FIG. 5 is a side elevational view of the system shown in FIG. 4, in the stowage position.

A video screen storage system is shown generally at 10 in the drawing figures. A system 10 is shown in its entirety in FIGS. 4 through 8, but typically is stored within a cabinet, such as the cabinet 12 shown in FIGS. 1 through 3. The cabinet 12, which may be of any appropriate form, is shown in FIGS. 1 through 3 as a cabinet having a pair of doors 14 and 16 which, when opened and retracted, expose the system 10 according to the invention, as described in greater detail below.

The system 10 includes two basic portions, a stationary portion 18 and an active portion 20. The stationary portion 18, as its name suggests, is stationary, while the active portion 20, as its name suggests is that portion which moves back and forth for deployment or storage of a video screen. The stationary portion 18 comprises a fixed frame which, as shown in the drawings, preferably comprises a base 22 and a pair of uprights 24. If needed in order to properly strengthen the structure, additional braces 26 can be employed, as well. The uprights 24 preferably are sufficiently tall, as shown in the drawing figures, so that the active portion 20, when stored, can rest against the uprights 18.

The active portion 20 comprises a moveable frame having a pair of uprights 28. The uprights 28 are hingedly secured to the base 22 as illustrated. A screen mount 30 extends from the uprights 28 for mounting of a video screen 32. The screen mount 30 can be a solid or framework structure having sufficient rigidity and strength for mounting of the video screen 32. For additional strength and rigidity, frame braces 34 are employed, as well, extending between the uprights 28 and the screen mount 30.

Figure 6:
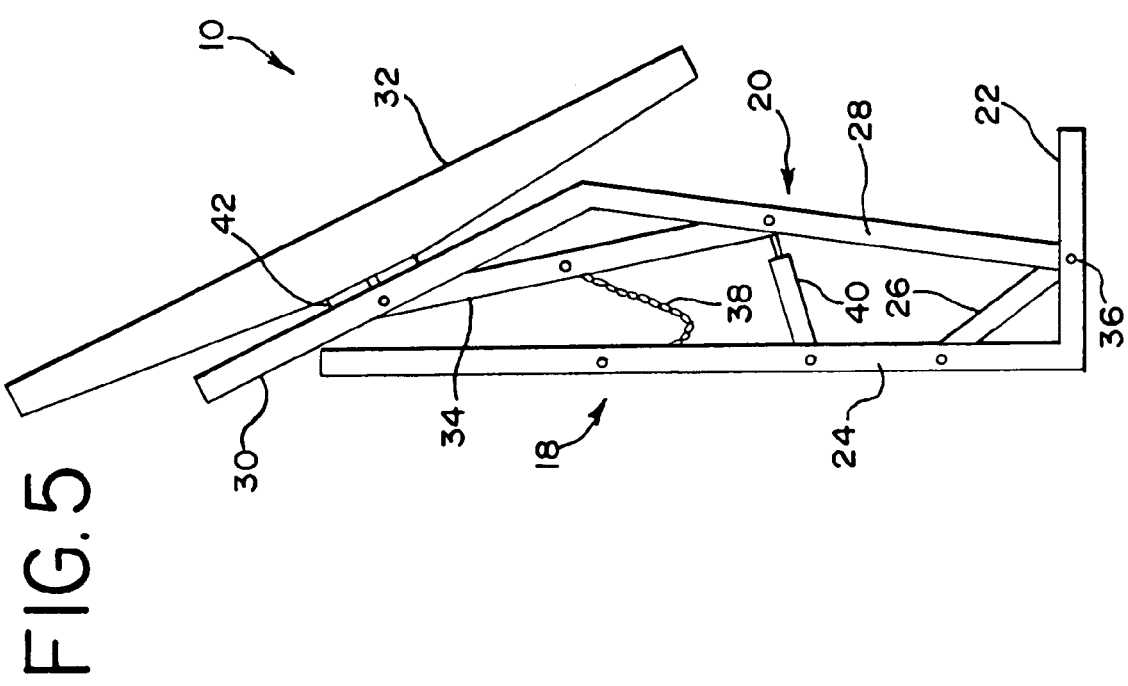
FIG. 6 is an elevational view similar to FIG. 5, but in the display position.
Figure 7:
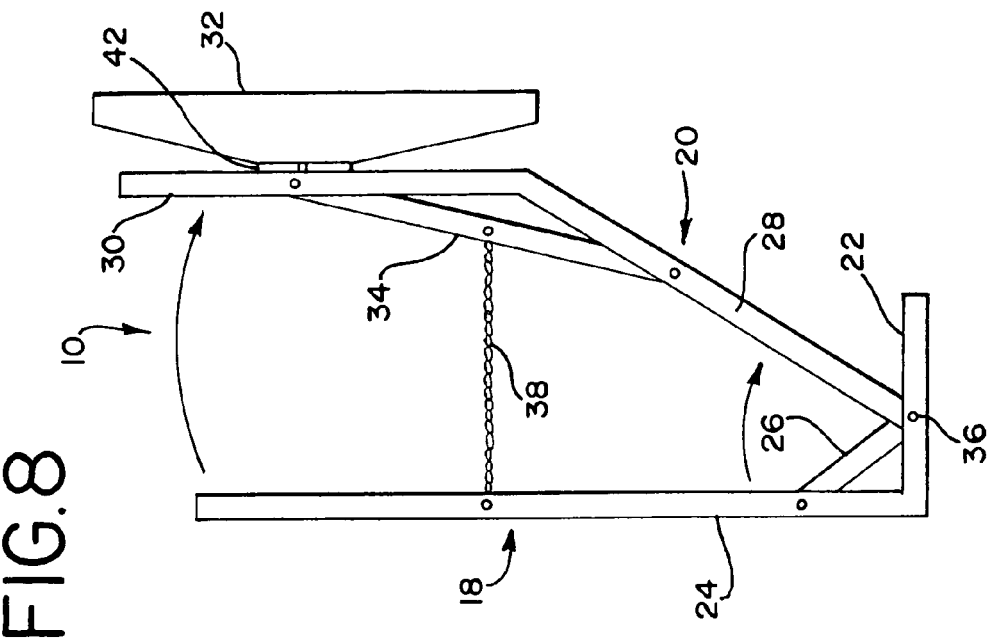
FIG. 7 is a view similar to FIG. 5 of another form of the invention.
Figure 8:
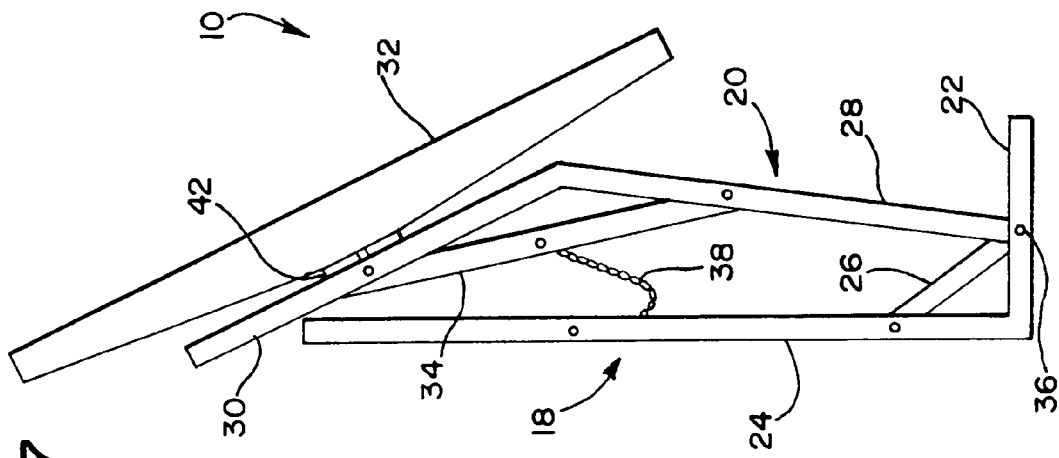
FIG. 8 is a view similar to FIG. 6 of an other form of the invention.

With the video screen 32 mounted on the active portion 20, the active portion 20 can be moved between a stowage position shown in FIGS. 4, 5 and 7, and a display position, shown in phantom in FIG. 4, and in FIGS. 6 and 8. In the stowage position, the video screen 32 is in a first position with a generally vertical orientation, and in the display position, the video screen 32 is in a second screen position, with the axis of the screen being generally horizontal for normal use. Because of the mass of the video screen 32 and due to the nature of formation of the structure of the active portion 20, when the active portion is moved between the stowage position and the display position, it passes through an "over center" orientation. That is, the center of gravity of the combination of the active portion 20 and the video screen 32 is such that when in the stowage position, the active portion 20 and the video screen 32 remain in place. When, however, the screen 32 and active portion 20 moved forwardly, the center of gravity of the combination passes the pivot point 36 of the hinged mounting of the active portion 20 to the base 22, and gravity therefore urges the active portion 20 forward in the direction of the arrows shown in FIGS. 6 and 8.

To prevent excessive forward movement of the active portion 20 and to hold the video screen 32 in the proper position for viewing, stays are provided for maintaining the movable frame in the display position. As shown in FIGS. 7 and 8, the stays may simply comprise a flexible connector 38 extending between the uprights 24 of the fixed frame and the frame braces 34 of the movable frame. The flexible connector 38 can be a chain, a wire, a rope, or any other flexible device that is sufficiently robust to hold the active portion 20 in the deployed position shown in FIG. 8.

In another form of the invention, the stay comprises not only the flexible connector 38, but also an operating device 40. The operating device can be a simple fluid cylinder, or can be a motor, such as a servo motor, for moving the active portion between the stowage position and the display position.

As illustrated in the drawing figures, the video screen 32 is mounted for rotation between a first, upright position shown in FIGS. 4, 5 and 7, and a second, horizontal and viewing position shown in phantom in FIG. 4, and in FIGS. 6 and 8, as well as FIG. 3. The video screen 32 is secured to the screen mount 32 on a rotatable union 42. The video screen 32 may be manually rotatable between the two positions illustrated or, preferably, a motor 44 is also employed. The motor 44 may be any type of motor such as a servo motor. A micro switch 46 is employed, in that instance, to halt operation of the motor 44 when the video screen 32 is moved between the two illustrated positions.

In operation, when stowed, the video screen storage and deployment system 10 can be wholly contained within the cabinet 12, and therefore be invisible. At the same time, because the video screen 32 is in a generally vertical orientation in the stowed position, the cabinet 12 can be relatively slim and attractive.

When deployment of the video screen 32 is desired, the doors 12 and 14 are opened, exposing the video screen 32 as shown in FIG. 2. Then, if the operating device 40 is used and is a motor, it is activated. The active portion 20 and screen 32 are then brought to the forward, deployed orientation shown if FIGS. 6 and 8. Then, the screen 32 must be rotated to the display position, and if a motor 44 is employed, the motor is activated for that purpose. Otherwise, the screen 32 is manually rotated about the union 42 to the orientation shown in FIGS. 3, 6 and 8, and in phantom in FIG. 4. As illustrated, the screen positions are approximately 90° from one another. Thus, the video screen 32 can be viewed in its normal, horizontal orientation.

The video screen storage and deployment system 10 of the invention permit storage in a relatively slim, space-saving format, but deployment in a typical, horizontal fashion for viewing. Various changes can be made to the invention without departing from the spirit thereof or scope of the following claims.

The invention claimed is:

1. A video screen storage and deployment system, composing
 a. a stationary portion and an active portion,
 b. said active portion having a stowage position and a display position, the video screen, in said stowage position, having a first screen position, and the video screen, in said display position, having a second screen position, said first and second screen positions being oriented about 90° from one another, and
 c. means in said active portion for rotating the video screen about an axis perpendicular to the video screen between said first and second screen positions.

2. The system according to claim 1, in which said stationary portion comprises a fixed frame and said active portion comprises a movable frame secured to said fixed frame.

3. The system according to claim 2, in which said fixed frame comprises a base and at least one upright.

4. The system according to claim 2, in which said moveable frame comprises at least one upright and a screen mount extending from said upright, said upright being hingedly secured to said fixed frame.

5. The system according to claim 2, including a stay for maintaining said movable frame in said display position.

6. The system according to claim 5, in which said stay comprises a flexible connector extending between said fixed frame and said movable frame.

7. The system according to claim 6, in which said flexible connector is selected from the group consisting of a chain, a wire and a rope.

8. The system according to claim 5, in which said stay comprises a fluid cylinder and a flexible connector.

9. The system according to claim 2, including a motor for moving said movable frame between said display and stationary positions.

10. The system according to claim 9, in which said motor comprises a servo motor.

11. The system according to claim 9, including a stay for maintaining said movable frame in said display position.

12. The system according to claim 1, in which said rotating means comprises a motor.

13. The system according to claim 1, in which said system is located in a cabinet.

14. The system according to claim 13, in which at least part of said active portion extends outside of said cabinet in said display position.

15. The system according to claim 1, in which, between the stowage position and the display position, a center of gravity of the active portion passes over a pivot point at which said active portion is secured to said stationary portion.

16. An arrangement for managing a video screen, comprising
 a. a cabinet,
 b. a video screen storage and deployment system in the cabinet, said system having
  i. a stationary portion and an active portion,
  ii. said active portion having a stowage position and a display position, the video screen, in said stowage position, having a first screen position, and the video screen, in said display position, having a second screen position, said first and second screen positions being oriented about 90° from one another, and iii. means in said active portion for rotating the video screen about an axis perpendicular to the video screen between said first and second screen positions.

17. The arrangement according to claim 16, in which said stationary portion comprises a fixed frame and said active portion comprises a movable frame secured to said fixed frame.

18. The arrangement according to claim 17, in which said fixed frame comprises a base and at least one upright.

19. The arrangement according to claim 17 in which said moveable frame comprises at least one upright and a screen mount extending from said upright, said upright being hingedly secured to said fixed frame.

20. The arrangement according to claim 17, including a stay for maintaining said movable frame in said display position.

* * * * *